(12) United States Patent
Tang et al.

(10) Patent No.: US 10,156,343 B2
(45) Date of Patent: Dec. 18, 2018

(54) OPTICAL FILM AND LIGHTING MODULE INCLUDING THE SAME

(71) Applicants: EFUN TECHNOLOGY CO., LTD., Tainan (TW); SIC TECHNOLOGY CO., LTD., Hsinchu (TW)

(72) Inventors: Shih-Chieh Tang, Tainan (TW); Ying-Tsung Lu, Tainan (TW); Shien-Tsung Wu, Hsinchu (TW); Wan-Shan Lee, Tainan (TW)

(73) Assignees: EFUN TECHNOLOGY CO., LTD., Tainan (TW); SIC TECHNOLOGY CO., LTD., Hsinchu (TW)

( * ) Notice: Subject to any disclaimer, the term of this patent is extended or adjusted under 35 U.S.C. 154(b) by 207 days.

(21) Appl. No.: 15/250,114

(22) Filed: Aug. 29, 2016

(65) Prior Publication Data

US 2017/0067603 A1  Mar. 9, 2017

(30) Foreign Application Priority Data

Sep. 3, 2015 (TW) .............................. 104129106 A
Sep. 3, 2015 (TW) .............................. 104129108 A

(51) Int. Cl.
| | |
|---|---|
| *F21V 5/00* | (2018.01) |
| *F21V 9/30* | (2018.01) |
| *F21Y 115/10* | (2016.01) |
| *B82Y 20/00* | (2011.01) |
| *B82Y 30/00* | (2011.01) |
| *F21Y 105/10* | (2016.01) |

(52) U.S. Cl.
CPC ................ *F21V 5/002* (2013.01); *F21V 9/30* (2018.02); *B82Y 20/00* (2013.01); *B82Y 30/00* (2013.01); *F21Y 2105/10* (2016.08); *F21Y 2115/10* (2016.08); *Y10S 977/774* (2013.01)

(58) Field of Classification Search
CPC ... F21V 5/002; F21V 9/30; F21V 1/17; F21V 3/08; F21V 3/12; F21V 5/004; F21V 5/10; F21V 9/40; F21V 9/32; F21V 9/45; F21Y 2105/10; F21Y 2115/10; B82Y 20/00; B82Y 30/00; Y10S 977/774; F21K 9/64; F21K 99/00
See application file for complete search history.

(56) References Cited

U.S. PATENT DOCUMENTS

| | | | |
|---|---|---|---|
| 2004/0145895 A1* | 7/2004 | Ouderkirk | H01L 33/46 362/260 |
| 2006/0072315 A1* | 4/2006 | Han | G02B 6/0026 362/231 |

(Continued)

*Primary Examiner* — Bao Q Truong
(74) *Attorney, Agent, or Firm* — Kirton McConkie; Evan R. Witt

(57) ABSTRACT

An optical film includes a blocking layer, and a main body unit including first and second base layers, a working layer and a side surface. The first base layer has a light incident surface and a first surface opposite to the light incident surface. The second base layer has a second surface facing the first surface and a light exiting surface opposite to the second surface. The working layer is interconnected between the first and second surfaces, and includes a plurality of quantum dots, which can be excited by a first light incident on the light incident surface to emit a second light. The side surface surrounds the light incident, first, second and light exiting surfaces. The blocking layer is bonded to the side surface.

14 Claims, 4 Drawing Sheets

(56) References Cited

U.S. PATENT DOCUMENTS

2010/0103648 A1\* 4/2010 Kim ...................... H01L 33/507
 362/97.1
2012/0170282 A1\* 7/2012 Lin ...................... G02B 6/0036
 362/341
2014/0063843 A1\* 3/2014 Yeo ........................ G02B 6/002
 362/608

\* cited by examiner

OPTICAL FILM AND LIGHTING MODULE INCLUDING THE SAME

CROSS-REFERENCE TO RELATED APPLICATION

This application claims priorities of Taiwanese Patent Application Nos. 104129106 and 104129108, both of which were filed on Sep. 3, 2015.

FIELD

The disclosure relates to an optical film and a lighting module including the optical film.

BACKGROUND

A conventional way of generating white light is conducted by exciting an optical film that includes a plurality of quantum dots. Specifically, the quantum dots are made of different materials or have different dimensions, and are excited by an incident light to emit lights that have wavelengths different from that of the incident light. The lights emitted by the quantum dots are mixed with the incident light to form white light. For example, the incident light may be a blue light emitted by a blue light emitting diode, and the lights emitted by the quantum dots may be red and green lights. The mixture of red, green and blue lights will produce white light.

The optical film may be used in a back light module of a display device, and provides the display device with wider color levels, chromaticity and color gamut, thereby achieving better viewer satisfaction.

The optical film includes a first surface through which the incident light enters, a second surface, opposite to the first surface, through which the white light exits, and aside surface connected between peripheries of the first and second surfaces. In practical use, it is found that a portion of the incident light may enter the optical film through the side surface, which may be caused by reflection, refraction or interference from an internal structure of the display device. A blue ring or blue halo is observed at a periphery of the optical film, accordingly. The blue light entering the optical film through the side surface may produce undesired excitation of the quantum dots and unwanted light mixture, which undermines image quality of the display device.

SUMMARY

Therefore, an object of the present disclosure is to provide an optical film and a lighting module including the optical film that can alleviate at least one of the drawbacks associated with the prior art.

According to one aspect of the present disclosure, an optical film includes a main body unit and a blocking layer.

The main body unit includes a first base layer, a second base layer, a working layer and a side surface.

The first base layer has a light incident surface and a first surface opposite to the light incident surface. The second base layer is spaced apart from the first base layer and has a second surface facing the first surface of the first base layer and a light exiting surface opposite to the second surface. The working layer is interconnected between the first surface and the second surface, and includes a plurality of quantum dots that are capable of being excited by a first light incident on the light incident surface to emit a second light having a wavelength greater than that of the first light. The side surface surrounds the light incident surface, the first and second surfaces and the light exiting surface and extends from a periphery of the light incident surface to a periphery of the light exiting surface. The blocking layer is bonded to the side surface so as to block the first light from entering the working layer through the side surface.

According to another aspect of the present disclosure, a lighting module includes the above optical film and a light emitting unit.

The light emitting unit is disposed adjacent to the light incident surface of the main body unit of the optical film, and emits the first light. When the first light enters the working layer through the light incident surface, the first light excites the quantum dots to emit the second light. The first and second lights are mixed and exit the light exiting surface.

BRIEF DESCRIPTION OF THE DRAWINGS

Other features and advantages of the present disclosure will become apparent in the following detailed description of the embodiment with reference to the accompanying drawings, of which.

DETAILED DESCRIPTION

Figure 1:
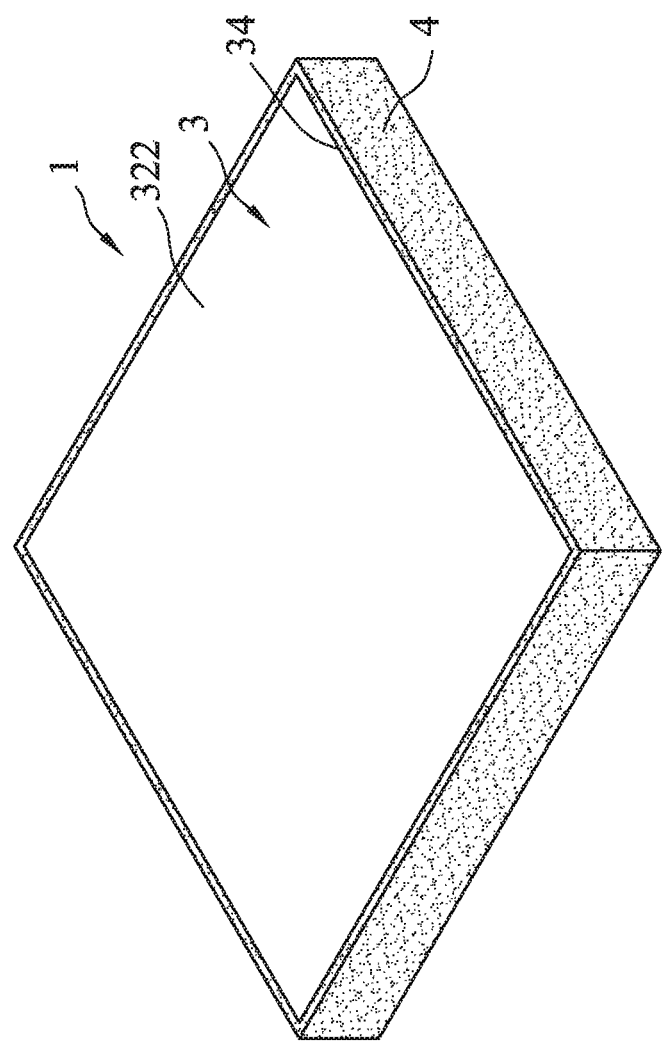
FIG. 1 is a perspective view of an embodiment of an optical film adapted to be used in a lighting module according to the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
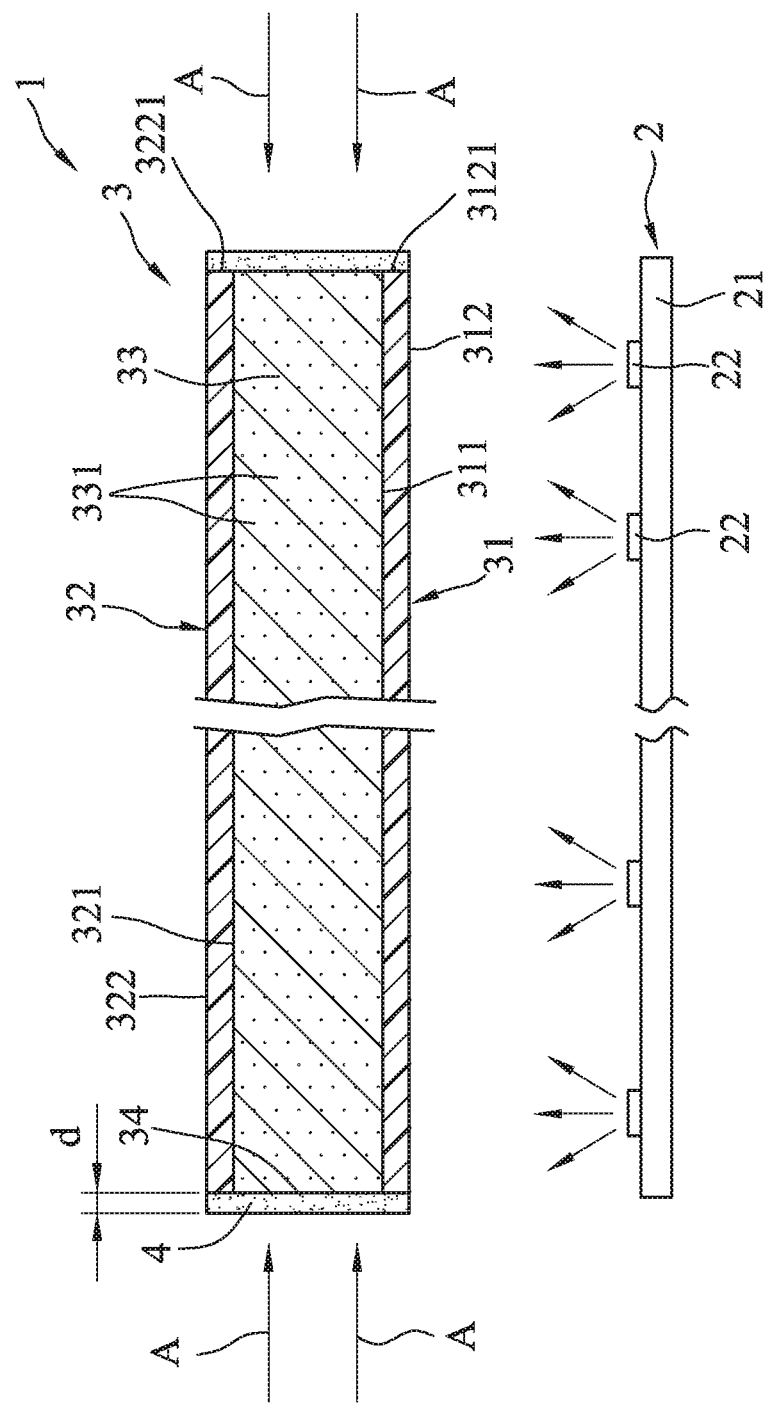
FIG. 2 is a fragmentary side view of a light emitting module including the embodiment of the present disclosure.

FIGS. 1 and 2 show an embodiment of an optical film 1 according to the present disclosure, and a lighting module including the optical film 1 and alight emitting unit 2.

The optical film 1 includes a main body unit 3 and a blocking layer 4.

The main body unit 3 includes a first base layer 31, a second base layer 32, a working layer 33 and a side surface 34.

The first base layer 31 has a light incident surface 312 and a first surface 311 opposite to the light incident surface 312. The second base layer 32 is spaced apart from the first base layer 31, and has a second surface 321 facing the first surface 311 of the first base layer 31 and a light exiting surface 322 opposite to the second surface 321. The first base layer 31 and the second base layer 32 may be made of a material selected from polyethylene terephthalate (PET), cycloolefin copolymer (COC), polyimide (PI), polyestersulfone (PES), polyethylene naphthalate (PEN), polycarbonate (PC), and combinations thereof.

The working layer 33 is interconnected between the first surface 311 of the first base layer 31 and the second surface 321 of the second base layer 32, and includes a plurality of quantum dots 331 that are capable of being excited by a first light incident on the light incident surface 312 to emit a second light having a wavelength greater than that of the first light. In this embodiment, the quantum dots 331 further emit a third light when being excited by the first light. The third light has a wavelength greater than that of the second light. The first, second and third lights may be respectively blue, green and red lights.

An exemplified process of manufacturing the working layer 33 is described below. The quantum dots 331 are distributed in a colloidal dispersion system, which may be made of a light-transmissible resin and which is capable of evenly distributing light passing therethrough. Afterwards, the colloidal dispersion system containing the quantum dots 331 is coated on either the first surface 311 of the first base layer 31 or the second surface 321 of the second base layer 32 to form the working layer 33. Optionally, the quantum dots 331 may be subjected to annealing based on actual requirements. The quantum dots 331 may be made of a nanocrystalline material, such as a II-VI or III-V semiconductor compound. The wavelength (i.e., color) of the light emitted by the quantum dots 331 can be altered by changing the material or the particle size of the quantum dots 331.

The side surface 34 surrounds the light incident surface 312, the first and second surfaces 311, 321, and the light exiting surface 322 and extends from a periphery 3121 of the light incident surface 312 to a periphery 3221 of the light exiting surface 322.

The blocking layer 4 is bonded to the side surface 34 of the main body unit 3 so as to block the first light, which is illustrated as arrows assigned with the letter A in FIG. 2, from entering the working layer 33 through the side surface 34. As an example shown in FIG. 1, the blocking layer 4 completely covers the side surface 34 of the main body unit 3. The blocking layer 4 may be made of a blue-light-absorbing material so as to absorb the blue light and prevent the blue light from entering the working layer 33 through the side surface 34. Alternatively, the blocking layer 4 may be made by coating an ultraviolet curable material that can be easily and rapidly cured on the side surface 34 and then irradiating the ultraviolet curable material with the ultraviolet light, thereby simplifying the manufacturing process for forming the blocking layer 4. The blocking layer 4 may have a yellowish color. For instance, the blocking layer 4 may have a thickness (d) (see FIG. 2) that extends in a direction normal to the side surface 34 and that ranges from 100 µm to 200 µm. Within such thickness range, the thickness of the blocking layer 4 is sufficient for blocking the blue light, and is not too thick to overrun the side surface 34. Moreover, the blocking layer 4 is also capable of blocking moisture from entering the working layer 33. Permeation of moisture into the main body unit 3 may deteriorate performance or even reliability of the lighting module. Alternatively, the blocking layer 4 may be made of a blue-light-reflecting material, such as a thermosetting blue-light-reflecting material, as long as the blocking layer 4 is capable of preventing the blue light from entering the working layer 33 through the side surface 34.

The light emitting unit 2 is disposed adjacent to the light incident surface 312 of the main body unit 3 of the optical film 1, and is adapted to emit the first light. When the first light enters the working layer 33 through the light incident surface 312, the first light excites the quantum dots 331 to emit the second light. The first and second lights are mixed and exit the working layer 33 through the light exiting surface 322.

In one form, the light emitting unit 2 includes a circuit board 21 and a plurality of light emitting diodes 22 disposed on the circuit board 21. The first light, such as the blue light, is emitted from the light emitting diodes 22. The quantum dots 311 further emit a third light when being excited by the first light. The third light has a wavelength greater than that of the second light. The second and third lights are respectively exemplified to be green and red lights. The first, second and third lights are mixed and exit the working layer 33 through the light exiting surface 322. It is noted that the mixed light of the blue, red and green lights is white, and that the lighting module of this disclosure may be used as a backlight module for a display device, which is disposed adjacent to a panel module of the display device. The light exiting surface 322 of the lighting module faces the panel module and the mixed light exits the light exiting surface 322 to irradiate the panel module.

Figure 3:
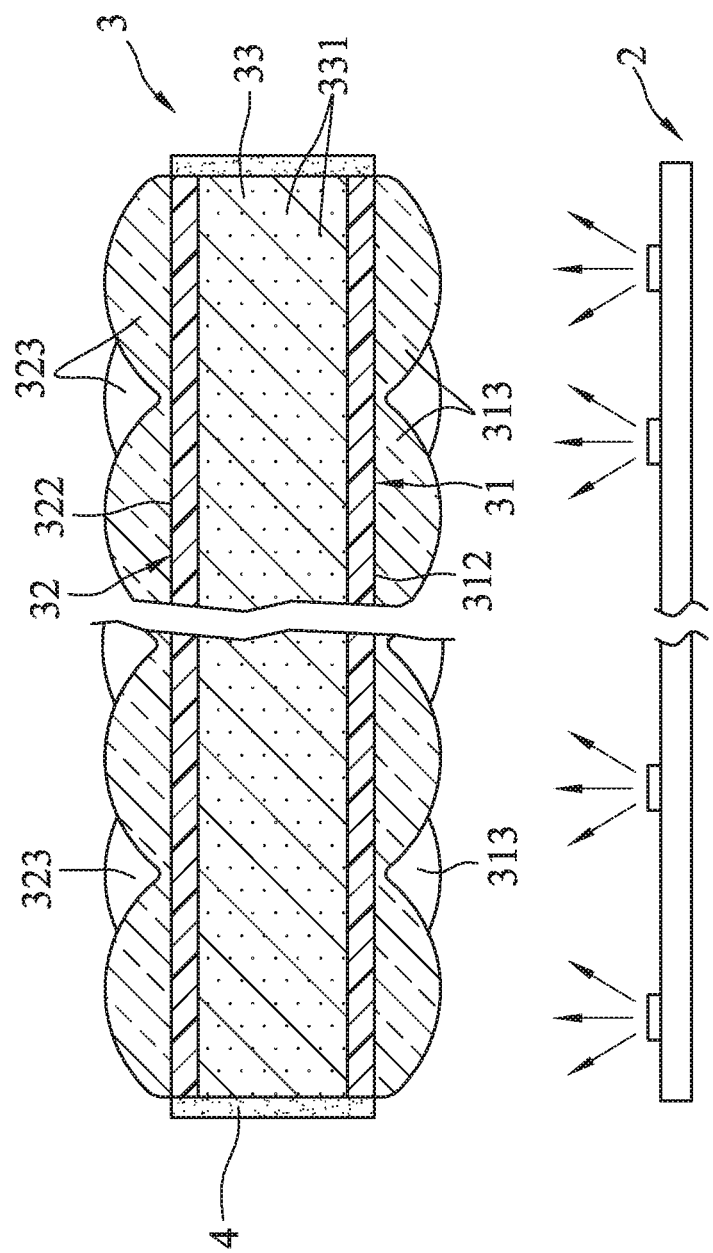
FIG. 3 is a fragmentary side view of the light emitting module including another configuration of the embodiment of the optical film according to the present disclosure.

Referring to FIG. 3, in another configuration, the first base layer 31 may further include at least one first microstructure 313 that is disposed on the light incident surface 312 and that is adapted to diffuse the first light before entering the working layer 33 through the light incident surface 312. The second base layer 32 may further include at least one second microstructure 323 disposed on the light exiting surface 322. The first and second lights are mixed, exit the working layer 33 through the light exiting surface 322, and are diffused by the second microstructure 323. In this embodiment, the first base layer 31 includes a plurality of first microstructures 313, and the second base layer 32 includes a plurality of second microstructures 323.

The first and second microstructures 313, 323 have the ability of evenly diffusing and distributing light, and may be made of a material selected from polymethyl methacrylate (PMMA), polyurethane (PU), silicone, and combinations thereof. The first and second microstructures 313, 323 may be the same or different and may be independently cone-shaped, semi-circle-shaped, hexagonal-pyramid-shaped, concave-convex-shaped, etc. The first microstructure 313 refracts the first light to increase the optical paths of the first light in the working layer 33, thereby enhancing excitation efficiency of the quantum dots 331, which results in wider color gamut and chromaticity. The second microstructure 323 is beneficial for decreasing total internal reflection at the light exiting surface 322, and therefore increases light extraction efficiency of the lighting module.

Figure 4:
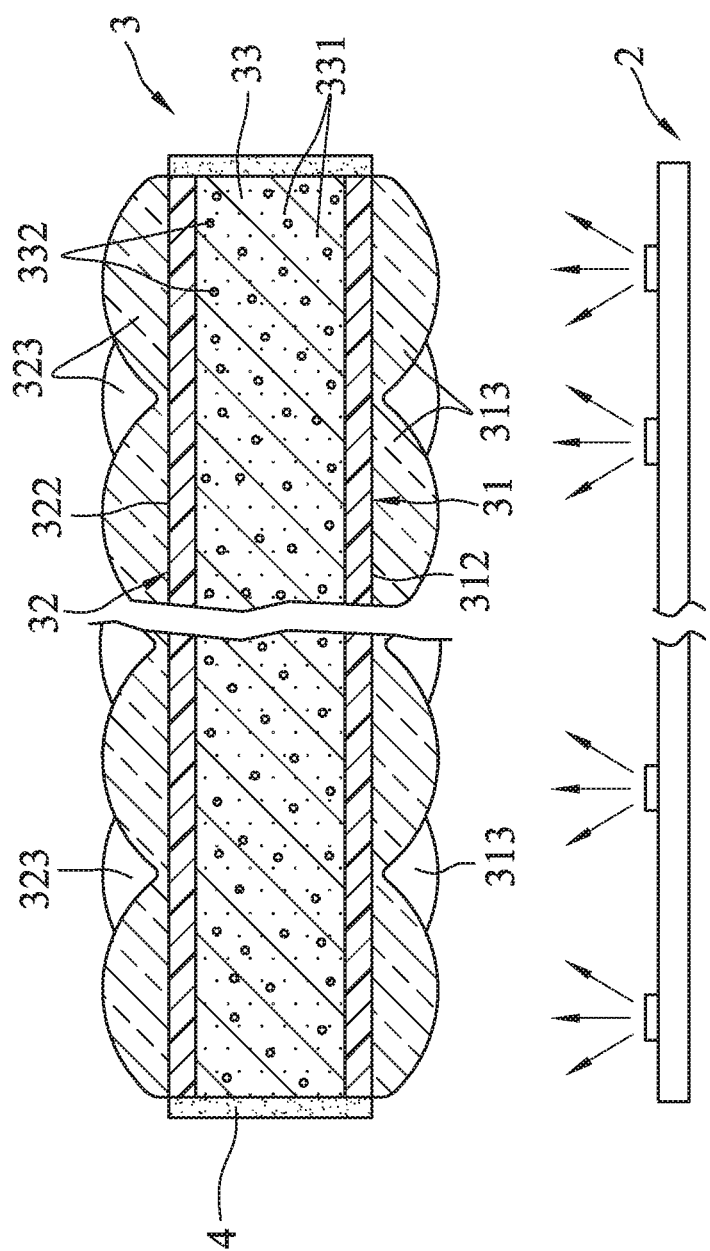
FIG. 4 is a fragmentary side view of the light emitting module including yet another configuration of the embodiment of the optical film according to the present disclosure.

Referring to FIG. 4, in yet another configuration, the working layer 33 may further include a plurality of diffuser particles 332 that are also capable of increasing the optical paths of the first light in the working layer 33 through multiple reflections and scattering against the diffuser particles 332.

In summary, with the blocking layer 4 bonded to the side surface 34, the first light is prevented from entering the working layer 33 through the side surface 34, thereby minimizing the blue ring or blue halo associated with the prior art. Moreover, the blocking layer 4 is also capable of blocking moisture from entering the working layer 33, thereby reducing performance or reliability deterioration of the lighting module caused by moisture.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical film comprising:
    a main body unit including
        a first base layer that has a light incident surface and a first surface opposite to said light incident surface,
        a second base layer that is spaced apart from said first base layer, and that has a second surface facing said first surface of said first base layer and a light exiting surface opposite to said second surface,
        a working layer interconnected between said first surface and said second surface, and including a plurality of quantum dots that are capable of being excited by a first light incident on said light incident surface to emit a second light having a wavelength greater than that of the first light, and
        a side surface that surrounds said light incident surface, said first and second surfaces, and said light exiting surface, and that extends from a periphery of said light incident surface to a periphery of said light exiting surface; and
    a blocking layer that is bonded to said side surface and that completely covers said side surface so as to block the first light from entering said working layer through said side surface.

2. The optical film as claimed in claim 1, wherein said blocking layer is made of an ultraviolet curable material.

3. The optical film as claimed in claim 2, wherein said blocking layer has a thickness that extends in a direction normal to said side surface and that ranges from 100 μm to 200 μm.

4. The optical film as claimed in claim 1, wherein said first base layer further has at least one first microstructure disposed on said light incident surface.

5. The optical film as claimed in claim 4, wherein said second base layer further has at least one second microstructure disposed on said light exiting surface.

6. The optical film as claimed in claim 1, wherein said working layer further includes a plurality of diffuser particles.

7. The optical film as claimed in claim 1, wherein said quantum dots further emit a third light having a wavelength greater than that of the second light when being excited by the first light, the first, second and third lights being respectively blue, green and red lights.

8. A lighting module comprising:
    an optical film of claim 1; and
    a light emitting unit that is disposed adjacent to said light incident surface of said main body unit of said optical film and that emits the first light,
    wherein, when the first light enters said working layer through said light incident surface, the first light excites said quantum dots to emit the second light, said first and second lights being mixed and exiting said light exiting surface.

9. The lighting module as claimed in claim 8, wherein said quantum dots further emit a third light having a wavelength greater than that of the second light when being excited by the first light, the first, second and third lights being respectively blue, green and red lights, the first, second and third lights being mixed and exiting said light exiting surface, said light emitting unit including a light emitting diode to emit the first light.

10. The lighting module as claimed in claim 8, wherein said blocking layer is made of an ultraviolet curable material.

11. The lighting module as claimed in claim 10, wherein said blocking layer has a thickness that extends in a direction normal to said side surface and that ranges from 100 μm to 200 μm.

12. The lighting module as claimed in claim 8, wherein said first base layer further has at least one first microstructure disposed on said light incident surface.

13. The lighting module as claimed in claim 12, wherein said second base layer further has at least one second microstructure disposed on said light exiting surface.

14. The lighting module as claimed in claim 8, wherein said working layer further includes a plurality of diffuser particles.

* * * * *